(12) United States Patent
Park et al.

(10) Patent No.: US 8,597,808 B2
(45) Date of Patent: Dec. 3, 2013

(54) BATTERY MODULE

(75) Inventors: Shi-Dong Park, Yongin-si (KR); Tae-Yong Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 215 days.

(21) Appl. No.: 13/050,845

(22) Filed: Mar. 17, 2011

(65) Prior Publication Data

US 2012/0114993 A1    May 10, 2012

(30) Foreign Application Priority Data

Nov. 8, 2010 (KR) ........................ 10-2010-0110571

(51) Int. Cl.
*H01M 2/10* (2006.01)

(52) U.S. Cl.
USPC ............................................. 429/53; 429/88

(58) Field of Classification Search
USPC .................... 429/53, 54, 55, 87, 88
See application file for complete search history.

(56) References Cited

U.S. PATENT DOCUMENTS

| | | | | |
|---|---|---|---|---|
| 3,494,798 | A * | 2/1970 | Teeter et al. | 429/54 |
| 6,586,131 | B2 * | 7/2003 | Hallifax et al. | 429/53 |
| 6,635,380 | B1 | 10/2003 | Shimoda et al. | |
| 7,875,375 | B2 | 1/2011 | Hamada et al. | |
| 2005/0069759 | A1 | 3/2005 | Shimamura et al. | |
| 2010/0233520 | A1 * | 9/2010 | Suzuki et al. | 429/53 X |

FOREIGN PATENT DOCUMENTS

| | | |
|---|---|---|
| EP | 1 898 480 A1 | 3/2008 |
| EP | 2 131 413 A1 | 12/2009 |
| GB | 668102 | 3/1952 |
| JP | 48-002420 | 1/1973 |
| JP | 59-093062 | 5/1984 |
| JP | 64-012182 | 1/1989 |
| JP | 5-65054 | 3/1993 |
| JP | 07-007064 U | 1/1995 |
| JP | 07-034550 U | 6/1995 |
| JP | 08-004538 | 1/1996 |
| JP | 2001-057202 | 2/2001 |
| JP | 2004-039582 | 2/2004 |
| JP | 2005-129487 | 5/2005 |
| JP | 2007-27011 | 2/2007 |
| JP | 2008-287939 | 11/2008 |
| KR | 2001-0000112 U | 1/2001 |

OTHER PUBLICATIONS

KIPO Office action dated Mar. 1, 2012, for Korean priority Patent application 10-2010-0110571, 4 pages.
Patent Abstracts of Japan, and English machine translation of Japanese Publication 2007-027011, listed above, 19 pages.
Extended European Search Report dated May 22, 2012 issued to corresponding European Patent Application No. 11168072.4 (4 pages).

(Continued)

*Primary Examiner* — Stephen J. Kalafut
(74) *Attorney, Agent, or Firm* — Christie, Parker & Hale, LLP (57) ABSTRACT

A battery module includes a plurality of rechargeable batteries each having a gas exhaust member openable at a threshold pressure; a housing holding the rechargeable batteries and having a gas exhaust hole; and a valve member covering the gas exhaust hole, wherein a pressure for opening the valve member is lower than the threshold pressure.

14 Claims, 10 Drawing Sheets

(56) References Cited

OTHER PUBLICATIONS

English machine translation of Japanese Publication 07-034550, 9 pages.
English Machine Translation of Japanese Publication No. JP 05-065054, 8 pages.
Korean Notice of Allowance dated Sep. 28, 2012 issued to Korean Priority Application No. 10-2010-0110571, 5 pages.
JPO Office action dated Apr. 30, 2013, for corresponding Japanese Patent application 2011-164829, (2 pages).
Patent Abstracts of Japan, and English machine translation of Japanese Publication 2008-287939, dated Nov. 27, 2008, (15 pages).
JPO Notice of Allowance dated Aug. 20, 2013, for corresponding Japanese Patent application 2011-164829, (3 pages).
Patent Abstracts of Japan, and English machine translation of Japanese Publication 08-004538 dated Jan. 9, 1996, listed above, (6 pages).

* cited by examiner

BATTERY MODULE

CROSS-REFERENCE TO RELATED APPLICATION

This application claims priority to and the benefit of Korean Patent Application No. 10-2010-0110571 filed in the Korean Intellectual Property Office on Nov. 8, 2010, the entire content of which is incorporated herein by reference.

BACKGROUND

1. Field

The described technology relates generally to a battery module.

2. Description of Related Art

A rechargeable battery is a battery that is dischargeable and rechargeable unlike a primary battery that is not rechargeable. Low-capacity rechargeable batteries are used for a small-sized portable electronic device such as a portable phone, a notebook computer, and a camcorder and high-capacity batteries are widely used as power sources for driving motors of hybrid cars and so on.

Recently, high-output rechargeable batteries using high-energy-density non-aqueous electrolytes have been developed and the high-output rechargeable batteries are formed as high-capacity rechargeable batteries by connecting a plurality of rechargeable batteries in series such that they can be used to drive an apparatus requiring a large amount of power, for example, motors of electrical cars.

Also, one high-capacity rechargeable battery is generally composed of a plurality of rechargeable batteries connected in series and a rechargeable battery may be formed in a cylindrical shape, a prismatic shape, etc.

A rechargeable battery has a vent which is opened when an internal pressure increases to a threshold amount to prevent the rechargeable battery from exploding due to the increase in the internal pressure of the rechargeable battery.

A gas exhausted from the rechargeable battery can be exhausted to the outside. If the internal gas of the rechargeable battery is not exhausted to the outside, the rechargeable battery may explode or ignite. In order to rapidly exhaust the internal gas of the rechargeable battery, a pressure inside a housing constituting the battery module should be sufficiently low. However, when the rechargeable batteries are positioned in a sealed housing, since the internal pressure of the housing may not be low enough to rapidly exhaust the gas, the rechargeable battery can explode.

Particularly, after a vent of one rechargeable battery is opened, since the internal pressure of the housing increases, even though a vent of another rechargeable battery is opened, the gas cannot be rapidly exhausted, so the rechargeable battery can explode.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a battery module having improved safety.

In one exemplary embodiment of the present invention, a battery module is provided that includes a plurality of rechargeable batteries each having a gas exhaust member openable at a threshold pressure; a housing holding the rechargeable batteries and having a gas exhaust hole; and a valve member covering the gas exhaust hole, wherein a pressure for opening the valve member is lower than the threshold pressure.

In one embodiment, the pressure for opening the valve member is between about 60% and about 90% of the pressure for opening the gas exhaust member. Additionally, the cover may have guide ribs to provide a passage through which a gas exhausted from the rechargeable batteries can flow.

In one embodiment, the battery module can also include a protecting member having gas exhaust holes on the gas exhaust members of the rechargeable batteries, and a gas exhaust protrusion extending around a circumference of each the gas exhaust holes between the body and the cover. Further, in one embodiment, the valve member has a curved internal face protruding toward a center of the valve member, wherein the curved internal face contacts itself. The valve member may include a rotating shaft having a center located higher than a side mass center of the valve member in a gravitational direction such that the valve member is biased into a closed position. In one embodiment, the valve member is tapered. Further, a support step may be located adjacent the gas exhaust hole to contact a lower end of the valve member when the valve member is in a closed position.

According to the exemplary embodiments of the present invention, since the valve member is provided on the housing, it is possible to easily exhaust a gas generated inside the housing, and since the pressure for opening the valve member of the housing is set to be lower than the pressure for opening the gas exhaust member of a rechargeable battery, it is possible to rapidly exhaust the gas generated in the rechargeable battery.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements in the specification and the drawings.

Figure 1:
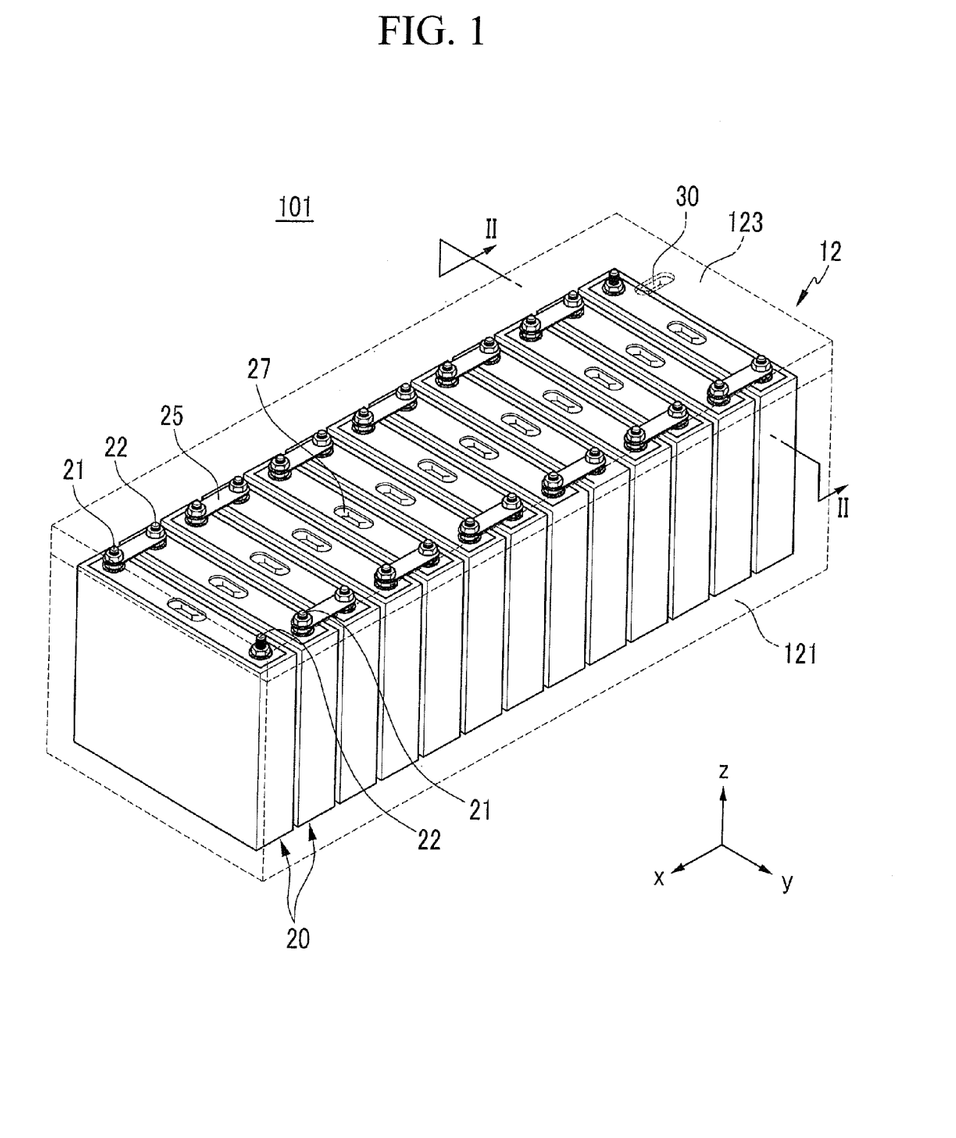
FIG. 1 is a perspective view illustrating a battery module according to a first exemplary embodiment of the present invention.
Figure 2:
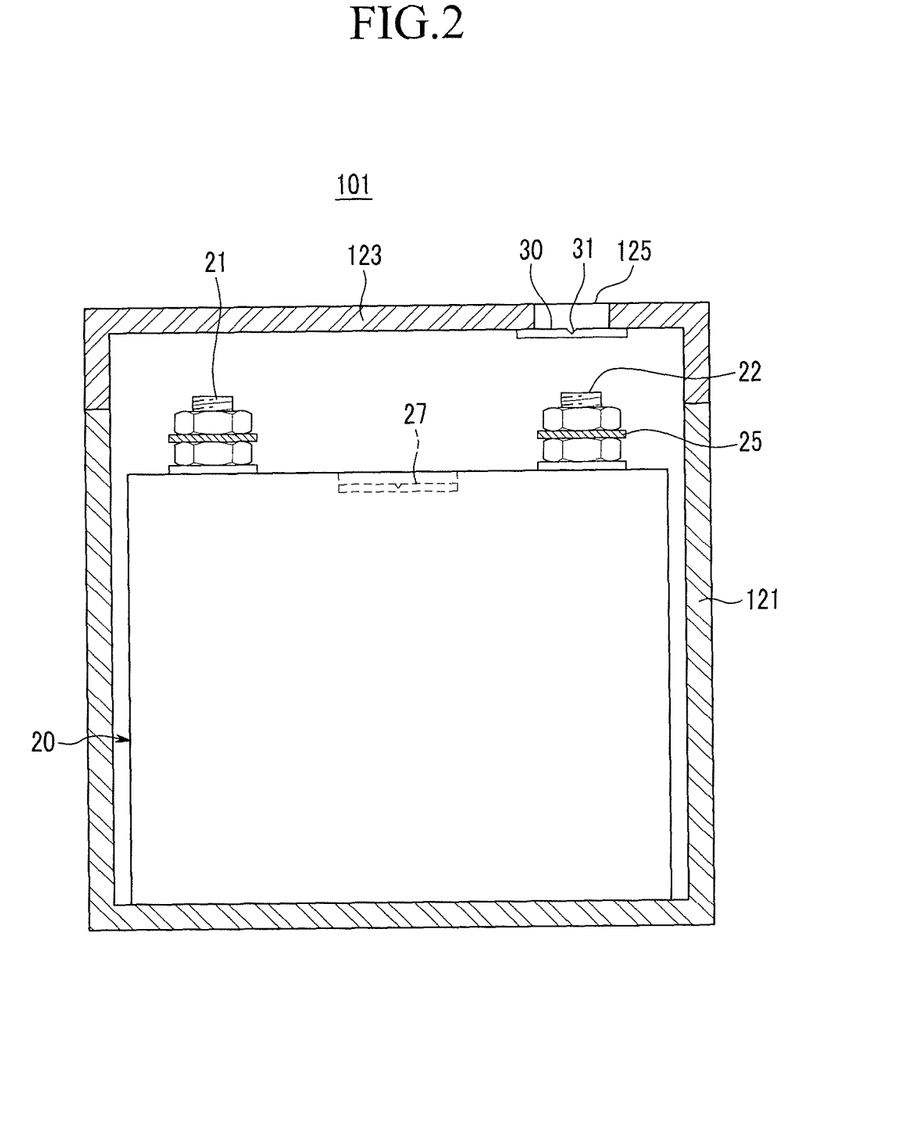
FIG. 2 is a cross-sectional view taken along line II-II in FIG. 1.

FIG. 1 is a perspective view illustrating a battery module according to a first exemplary embodiment of the present invention, and FIG. 2 is a cross-sectional view taken along line II-II in FIG. 1.

Referring to FIGS. 1 and 2, a battery module 101 according to the first exemplary embodiment of the present invention includes a plurality of rechargeable batteries 20, a housing 12 holding the rechargeable batteries 20, and a valve member 30 provided in a gas exhaust hole 125 (FIG. 2) of the housing 12.

Since the plurality of rechargeable batteries 20 are provided in the housing 12, a case where the rechargeable batteries 20 are prismatic lithium ion rechargeable batteries will be described as an example. However, the present invention is not limited thereto, but is applicable to various forms of batteries, for example, lithium polymer batteries or cylindrical batteries.

A rechargeable battery 20 includes a positive electrode terminal 21, a negative electrode terminal 22, and a gas exhaust member 27 which is opened at a threshold pressure to exhaust a gas. When the internal pressure of a rechargeable battery increases, the gas exhaust member 27 is opened at the threshold pressure to provide a passage for exhausting an internal gas of the rechargeable battery 20 to the outside.

The plurality of rechargeable batteries 20 are connected in a series by bus bars 25 and are installed inside the housing 12 and secured to the positive and negative electrode terminals 21, 22 by a nut 28.

In one embodiment, the housing 12 has a substantially rectangular parallelepiped shape, and includes a body 121 having an internal space and a cover 123 combined with an opening of the body 121. The housing 12 has a sealed structure, and the rechargeable batteries 20 are cooled by cooling the housing 12.

In one embodiment, the gas exhaust hole 125 is formed in the cover 123 and has a substantially elliptical planar shape. The valve member 30 is provided to cover the gas exhaust hole 125, and is formed in a plate form having a notch 31 to be opened at the threshold pressure.

A pressure for opening the valve member 30 is set to be lower than a pressure for opening the gas exhaust member 27. When the internal pressure of the rechargeable battery 20 increases so as to open the gas exhaust member 27, it is important to rapidly exhaust a gas because otherwise the rechargeable battery 20 may explode. As such, when the internal pressure of the rechargeable battery 20 increases to a threshold pressure, the gas exhaust member 27 opens to relieve the pressure in the housing 12.

Accordingly, the internal pressure of the housing 12 should be lower than the pressure for opening the gas exhaust member 27 and the valve member 30 should be opened before the internal pressure of the housing 12 reaches the pressure for opening the gas exhaust member 27 so as to reduce the internal pressure of the housing 12. If the internal pressure of the housing 12 is equal to the pressure for opening the gas exhaust member 27, even though the gas exhaust member 27 is opened, the gas cannot be exhausted.

The pressure for opening the valve member 30 may be set to be a level corresponding to between about 60% and about 90% of the pressure for opening the gas exhaust member 27. If the pressure for opening the valve member 30 is higher than about 90% of the pressure for opening the gas exhaust member 27, the internal gas of the rechargeable battery 20 may not be able to be rapidly exhausted, and if the pressure for opening the valve member 30 is less than about 60% of the pressure for opening the gas exhaust member 27, the valve member 30 may be too easily opened by an impact or a change in the pressure and thus the housing 12 may not be able to be completely sealed.

Since the internal space of the housing 12 is larger than the internal space of the rechargeable battery 20, even when the gas is exhausted from one rechargeable battery 20, the internal pressure of the housing 12 does not easily increase to the pressure for opening the valve member 30. Therefore, according to the first exemplary embodiment of the present invention, the housing 12 is opened at an appropriate pressure, whereby it is possible to maintain the sealing of the housing 12 and rapidly exhaust the internal gas of the rechargeable battery 20 when the gas exhaust member 27 is opened. As a result, the safety of the battery module 101 is improved.

Figure 3:
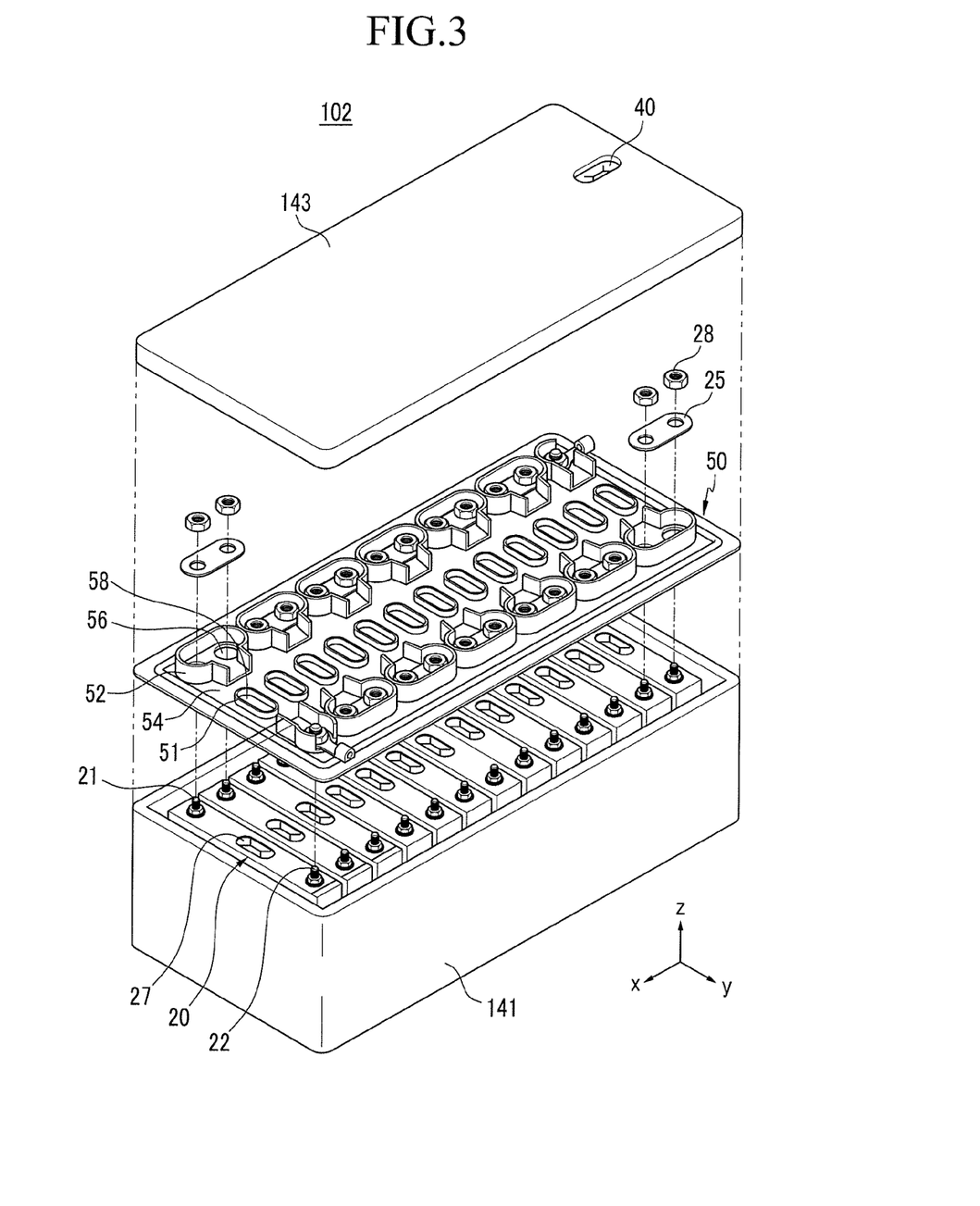
FIG. 3 is a partially exploded perspective view illustrating a battery module according to a second exemplary embodiment of the present invention.
Figure 4:
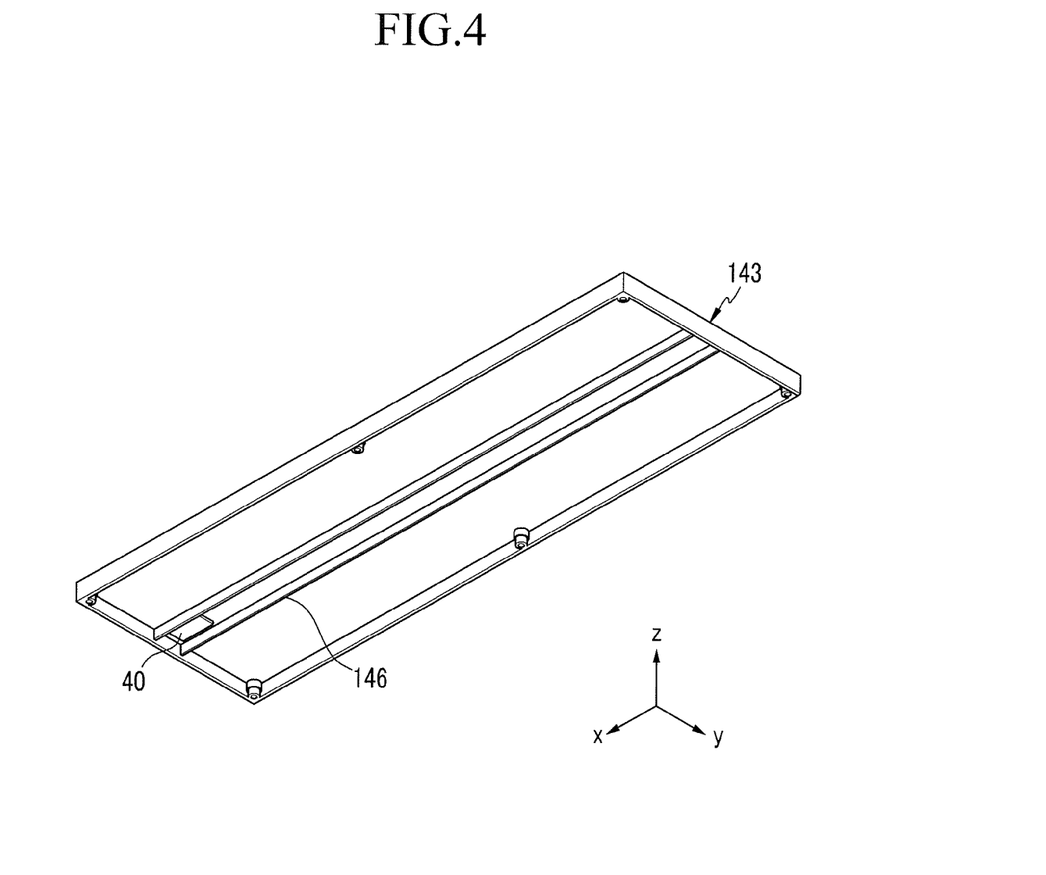
FIG. 4 is a perspective view illustrating a cover of a housing according to the second exemplary embodiment of the present invention.
Figure 5:
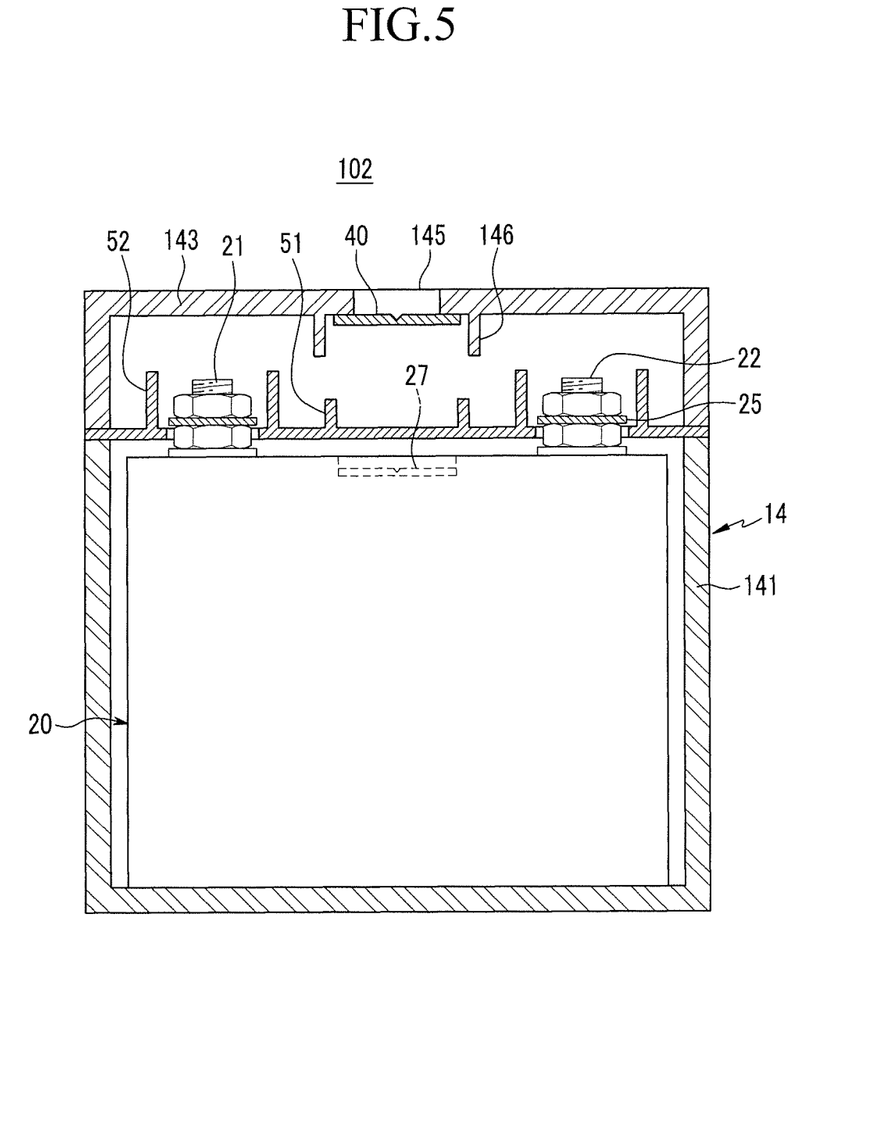
FIG. 5 is a vertical cross-sectional view of the battery module of FIG. 3.

FIG. 3 is an exploded perspective view illustrating a battery module according to a second exemplary embodiment of the present invention, and FIG. 4 is a perspective view when a cover according to the second exemplary embodiment of the present invention is seen from the below.

Referring to FIGS. 3 and 4, a battery module 102 according to the second exemplary embodiment of the present invention includes a plurality of rechargeable batteries 20, a housing holding the rechargeable batteries 20, and a valve member 40 provided in a gas exhaust hole of the housing 14.

The plurality of rechargeable batteries 20 are provided in the housing, and the housing 14 includes a body 141 having an internal space and a cover 143 combined with an opening of the body 141. The housing has a sealed structure and the rechargeable batteries 20 are cooled by cooling the housing.

A protecting member 50 is provided between the body 141 and the cover 143, and the protecting member 50 is provided on the rechargeable batteries 20. The protecting member 50 includes a support plate 54 formed in a plate shape, and protrusions 52 formed to protrude on the support plate 54 and surrounding the circumferences of bus bars 25.

The support plate 54 has a substantially rectangular plate shape, and the protecting member 50 is combined with an opening of the body 141 to be fixed to the body 141. Terminal holes 56 into which terminals 21 and 22 are inserted are formed in the support plate 54 within the protrusions 52.

Openings 58 are formed in the support plate 54, and the openings 58 are positioned on the gas exhaust members 27 of the rechargeable batteries 20. Gas exhaust protrusions 51 are formed around the openings 58, and the gas exhaust protrusions 51 are formed along the circumferences of the openings 58. Therefore, when the gas exhaust members 27 are opened, the internal gas of the rechargeable batteries 20 can be rapidly exhausted by leading of the openings 58 and the gas exhaust protrusions 51.

Two guide ribs 146 are formed on the cover 143 to extend in a direction of the stacked rechargeable batteries and are formed on the outside of the gas exhaust protrusions 51 such that the gas exhaust protrusions 51 are positioned between the guide ribs 146 in the width direction.

When the gas exhaust members 27 are opened to exhaust the gas, a material such as an electrolyte together with black smoke is exhausted, and if the material exhausted from the rechargeable batteries 20 pollutes the terminals 21 and 22 or the bus bars 25, a short circuit may occur. However, if the gas exhaust protrusions 51 and the guide ribs 146 are formed as in the second exemplary embodiment, since the material exhausted from the rechargeable batteries 20 moves upward by the gas exhaust protrusions 51 and is substantially prevented from being laterally spread by the guide ribs 146, it is possible to prevent the terminals 21 and 22 or the bus bars 25 from becoming polluted. Moreover, since the protrusions 52 surround the bus bars 25 and the terminals 21 and 22, it is possible to more reliably prevent the terminals 21 and 22 and the bus bars 25 from becoming polluted by a foreign substance.

The gas exhaust hole 145 is formed in the cover 143, and has a substantially elliptical planar shape. The valve member 40 is provided to cover the gas exhaust hole 145 and is formed in a plate shape having a notch.

The pressure for opening the valve member 40 is set to be lower than the pressure for opening the gas exhaust members 27.

Figure 6:
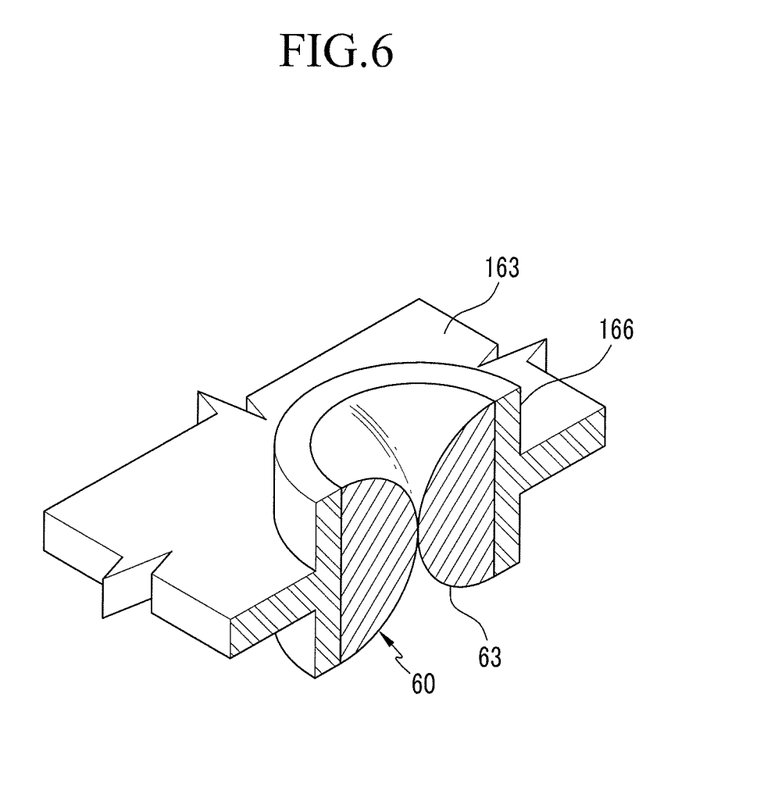
FIG. 6 is a cut perspective view illustrating a housing and a valve member according to a third exemplary embodiment of the present invention.
Figure 7A:
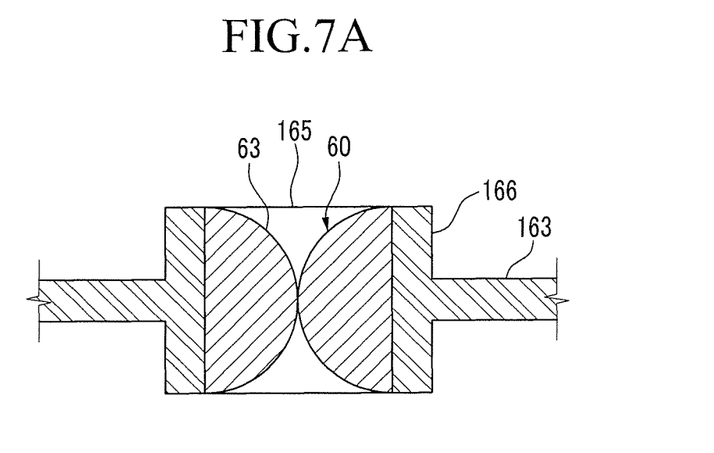
FIGS. 7A and 7B are a cross-sectional view illustrating a state in which the valve member of FIG. 6 is closed and open, respectively.
Figure 7B:
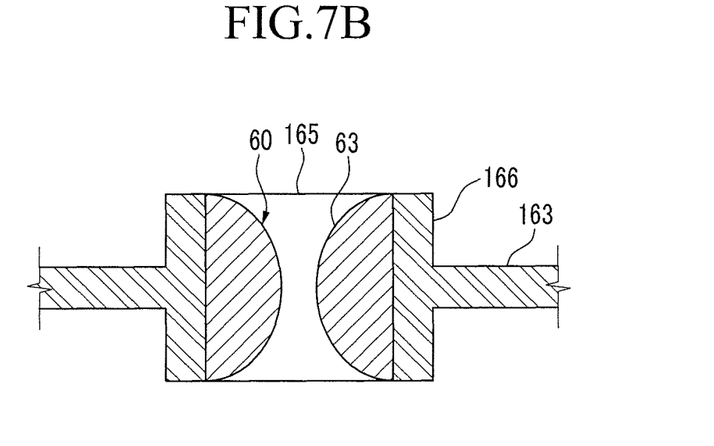

FIG. 6 is a cut perspective view illustrating a housing and a valve member according to a third exemplary embodiment of the present invention, FIG. 7A is a cross-sectional view illustrating a state in which the valve member is closed according to the third exemplary embodiment of the present invention, and FIG. 7B is a cross-sectional view illustrating a state in which the valve member is opened according to the third exemplary embodiment of the present invention.

A battery module according to the third exemplary embodiment of the present invention has the same structure as the battery module according to the first exemplary embodiment of the present invention except for the structures of the cover and the valve member, and thus a repeated description of the same structure is omitted.

As shown in FIGS. 6 and 7A, a gas exhaust hole 165 is formed in a cover 163 of the housing, and a valve protrusion 166 is formed at the circumference of the gas exhaust hole 165. The valve protrusion 166 is formed to extend along the circumference of the gas exhaust hole and the valve member 60 is inserted into the valve protrusion 166. The valve member 60 has a pipe shape having a central hole, and has a curved internal face 63. The curved internal face 63 protrudes inward such that the a surface of the curved interior surface contacts itself, thereby sealing the central hole of the valve member 60. The valve member 60 is provided inside the valve protrusion 166 to be pressed inward, and thus the curved internal face 63 contacts itself when the internal pressure of the housing is low, thereby reliably sealing the housing.

Since the valve member 60 is formed with an elastic material, when the internal pressure of the housing increases, the curved internal face 63 is separated and opened as shown in FIG. 7B, and thus the internal gas of the housing can be exhausted to the outside.

Figure 8:
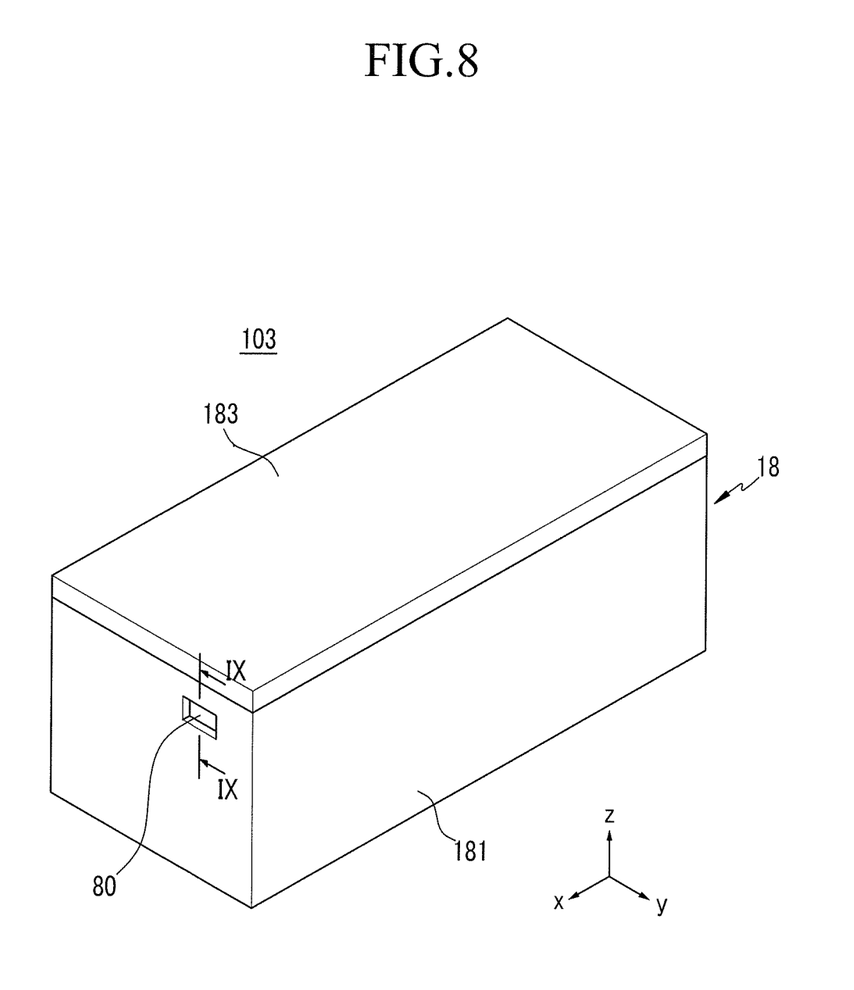
FIG. 8 is a perspective view illustrating a battery module according to a fourth exemplary embodiment of the present invention.
Figure 9:
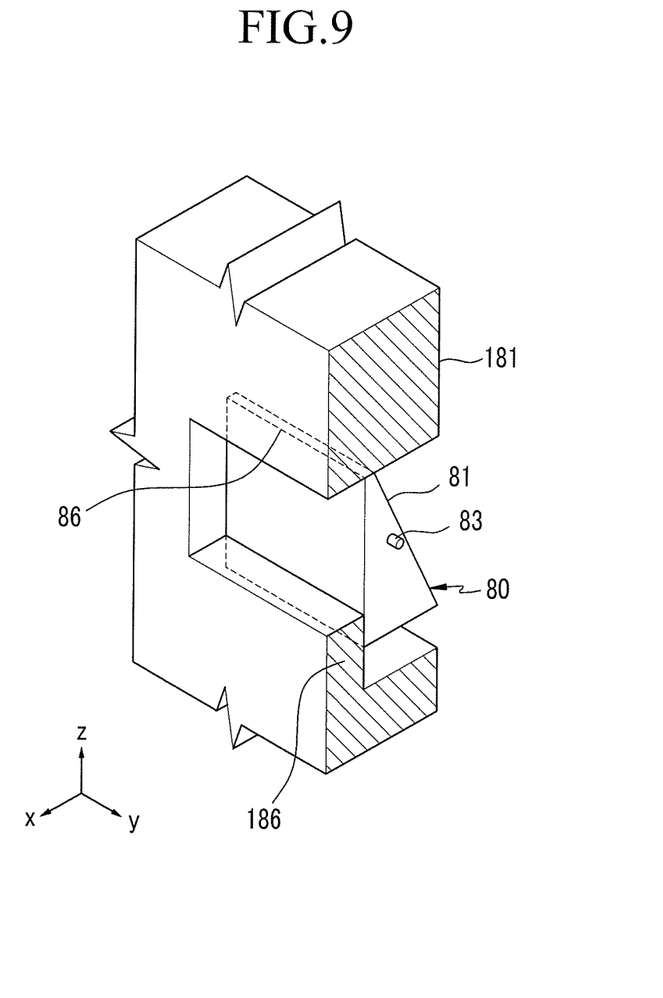
FIG. 9 is a cut perspective view illustrating a housing of the battery module of FIG. 8.

FIG. 8 is a perspective view illustrating a battery module according to a fourth exemplary embodiment of the present invention, and FIG. 9 is a cut perspective view illustrating a housing of the battery module according to the fourth exemplary embodiment of the present invention.

Referring to FIGS. 8 and 9, a battery module 103 according to the fourth exemplary embodiment has the same structure as the battery module according to the first exemplary embodiment of the present invention except for structures of a housing 18 and a valve member 80, and thus a repeated description of the same structure is omitted.

The housing 18 of the battery module 103 according to the fourth exemplary embodiment includes a body 181 and a cover 183 combined with the body 181, wherein a gas exhaust hole 185 is formed in the body 181 and a valve member 80 is installed inside the gas exhaust hole 185. When the battery module 103 is installed in a vehicle, the gas exhaust hole 185 is formed in a face of the body 181 that faces a direction opposite to a main movement direction of the vehicle.

A support step 186 is formed at the lower end of the gas exhaust hole 185 to support the lower part of the valve member 80. The valve member 80 is formed in a substantially triangularly-prismatic shape and has an inclined face 81 formed to be inclined such that the cross-sectional area increases toward the lower end. A support face 86 is formed at the upper end of the valve member 80 to reliably seal the gas exhaust hole 185.

Figure 10:
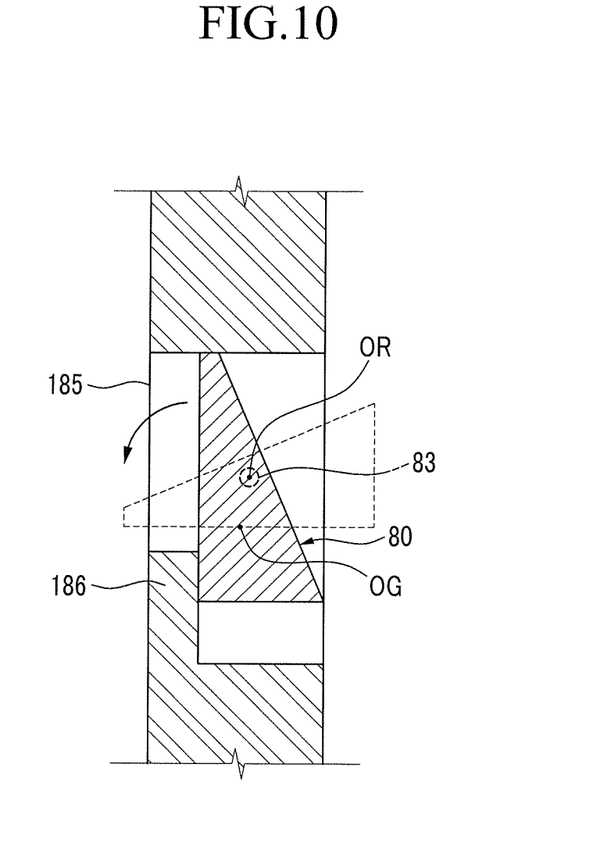
FIG. 10 is a cross-sectional view taken along line X-X in FIG. 8 according to the fourth exemplary embodiment of the present invention.

A rotating shaft 83 is connected with the valve member 80 to be rotatable with respect to the body 181. As shown in FIG. 10, the center OR of the rotating shaft of the valve member 80 is positioned in an upper half of the side mass center OG of the valve member 80 and is positioned farther from the support step 186 than the side mass center OG. Therefore, when the internal pressure of the housing 18 is low, the lower part of the valve member 80 is in contact with the support step 186 due to the weight of the valve member 80, thereby sealing the gas exhaust hole 185, i.e., the valve member is biased by gravity into the closed state.

However, if the internal pressure of the housing 18 increases, the valve member 80 rotates so as to open the gas exhaust hole 185. Therefore, it is possible to easily exhaust the internal gas of the housing 18 to the outside.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 101, 102, 103: Battery module | 12, 14, 18: Housing |
| 121, 141, 181: Body | 123, 143, 163, 183: Cover |
| 124, 145, 165, 185: Gas exhaust hole | 146: Guide rib |
| 166: Valve protrusion | 186: Support step |
| 20: Rechargeable battery | 21: Positive electrode terminal |
| 22: Negative electrode terminal | 25: Bus bar |
| 27: Gas exhaust member | 30, 40, 60, 80: Valve member |
| 31: Notch | 50: Protecting member |
| 51: Gas exhaust protrusion | 52: Protruding part |
| 54: Support plate | 56: Terminal hole |
| 58: Pore | 63: Internal face |
| 81: Inclined face | 83: Rotating shaft |
| 86: Support face | |

What is claimed is:

1. A battery module comprising:
   a plurality of rechargeable batteries each having a gas exhaust member openable at a threshold pressure, wherein the threshold pressure is substantially equal for each of the rechargeable batteries;
   a housing holding the rechargeable batteries and having a gas exhaust hole; and
   a valve member covering the gas exhaust hole, wherein a pressure for opening the valve member is lower than the threshold pressure.

2. The battery module of claim 1, wherein the pressure for opening the valve member is between about 60% and about 90% of the threshold pressure for opening the gas exhaust member.

3. The battery module of claim 1, wherein the housing comprises a body holding the rechargeable batteries and a cover coupled to the body.

4. The battery module of claim 3, wherein the valve member is on the cover.

5. The battery module of claim 4, wherein the cover has guide ribs to provide a passage through which a gas exhausted from the rechargeable batteries can flow.

6. The battery module of claim 5, further comprising:
- a protecting member having gas exhaust holes on the gas exhaust members of the rechargeable batteries, and
- a gas exhaust protrusion extending around a circumference of each the gas exhaust holes between the body and the cover.

7. The battery module of claim 3, wherein the valve member is on the body.

8. The battery module of claim 1, wherein the valve member has a curved internal face protruding toward a center of the valve member, wherein the curved internal face contacts itself.

9. The battery module of claim 1, wherein the valve member comprises an elastic material.

10. The battery module of claim 9, further comprising a gas exhaust protrusion extending along a circumference of the gas exhaust hole, wherein the valve member is within the gas exhaust protrusion.

11. The battery module of claim 1, wherein the valve member is rotatable.

12. The battery module of claim 11, wherein the valve member comprises a rotating shaft having a center located higher than a side mass center of the valve member in a gravitational direction such that the valve member is biased into a closed position.

13. The battery module of claim 11, wherein the valve member is tapered.

14. The battery module of claim 11, wherein a support step is located adjacent the gas exhaust hole to contact a lower end of the valve member when the valve member is in a closed position.

* * * * *

UNITED STATES PATENT AND TRADEMARK OFFICE
CERTIFICATE OF CORRECTION

PATENT NO. : 8,597,808 B2
APPLICATION NO. : 13/050845
DATED : December 3, 2013
INVENTOR(S) : Shi-Dong Park et al.

It is certified that error appears in the above-identified patent and that said Letters Patent is hereby corrected as shown below:

In the Claims

Column 7, Claim 6, line 8      After "each"

Insert -- of --

Signed and Sealed this
Twenty-sixth Day of May, 2015

Michelle K. Lee
*Director of the United States Patent and Trademark Office*